United States Patent
DeLuca et al.

(10) Patent No.: US 10,171,549 B2
(45) Date of Patent: Jan. 1, 2019

(54) NOTIFICATION ALERTS BASED ON INCREASED ACCESS TO A DIGITAL RESOURCE

(71) Applicant: International Business Machines Corporation, Armonk, NY (US)

(72) Inventors: Lisa Seacat DeLuca, Baltimore, MD (US); Dana L. Price, Surf City, NC (US); Aaron J. Quirk, Cary, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 15/050,653

(22) Filed: Feb. 23, 2016

(65) Prior Publication Data
US 2017/0244618 A1    Aug. 24, 2017

(51) Int. Cl.
*G06F 15/173* (2006.01)
*H04L 29/08* (2006.01)

(52) U.S. Cl.
CPC .............. *H04L 67/02* (2013.01); *H04L 67/22* (2013.01); *H04L 67/306* (2013.01)

(58) Field of Classification Search
CPC ........ H04L 67/02; H04L 67/22; H04L 67/306
See application file for complete search history.

(56) References Cited

U.S. PATENT DOCUMENTS

| | | | |
|---|---|---|---|
| 7,774,335 B1 | 8/2010 | Scofield et al. | |
| 2013/0159826 A1 | 6/2013 | Mason et al. | |
| 2014/0067958 A1* | 3/2014 | Bradley | G06Q 30/0241 709/204 |
| 2014/0156676 A1 | 6/2014 | Brust et al. | |
| 2014/0293824 A1* | 10/2014 | Castro Castro | H04L 41/142 370/252 |

* cited by examiner

*Primary Examiner* — Yves Dalencourt
(74) *Attorney, Agent, or Firm* — Daniel R. Simek

(57) ABSTRACT

A method for event notification. In one embodiment, the method includes a computer processor identifying a profile of a first user, wherein the profile of the first user includes one or more profile elements. The method further includes identifying a plurality of users having a corresponding profile that includes at least one profile element in common with the identified profile of the first user. The method further includes identifying a computer network accessible resource. The method further includes determining an increase in activity of the identified computer network accessible resource by the identified plurality of users. The method further includes communicating a notification to the first user, wherein the communicated notification provides an indication of the determined increase in activity of the identified computer network accessible resource by the identified plurality of users.

19 Claims, 4 Drawing Sheets

NOTIFICATION ALERTS BASED ON INCREASED ACCESS TO A DIGITAL RESOURCE

BACKGROUND OF THE INVENTION

The present invention relates generally to the field of digital communication, and more particularly to identifying and communicating a level of interest for a digital resource to a user according to access characteristics associated with the digital resource.

Digital resources, such as text, videos, computer programs, are accessible via networked computer systems, such as the Internet. Digital resources may be available, for example, from individuals, government entities, business enterprises, educational organizations, news services, and social groups. Users may access digital resource from a variety of computing devices, such as: smartphones, tablet computers, personal computers, and networked devices, such as smart televisions. The amount of digital resources that are accessible to users is growing exponentially. Unlike libraries, which may utilize a standardized system (e.g., Dewey Decimal System) to identify and catalog resources, such as books and periodicals, resources accessed via the Internet, for example, are not identified and organized using a rigorous system.

Items of interest to a user (i.e., digital resources) may be located by an on-line search engine. However, each search engine is driven by algorithms that rank and organize content (e.g., digital resources). Some search engine queries can generate millions of results, which makes identifying items of interest difficult for a user. In addition, some on-line content is structured to bias the ranking of a search engine. Search engines may not identify rapid changes of interest in a resource by users. Social media outlets may capture trending events and/or discussions that are related to some resources of interest. Syndicated information feeds may identify other items of interest to a user. Some services provide a user a notification when an item of interest is trending.

SUMMARY

According to aspects of the present invention, there is a method, computer program product, and/or system for event notification. In an embodiment, the method includes one or more computer processors identifying a profile of a first user, wherein the profile of the first user includes one or more profile elements. The method further includes one or more computer processors identifying a plurality of users having a corresponding profile that includes at least one profile element in common with the identified profile of the first user. The method further includes one or more computer processors identifying a computer network accessible resource. The method further includes one or more computer processors determining an increase in activity of the identified computer network accessible resource by the identified plurality of users. The method further includes one or more computer processors communicating a notification to the first user and the communicated notification provides an indication of the determined increase in activity of the identified computer network accessible resource by the identified plurality of users.

DETAILED DESCRIPTION

Figure 1:
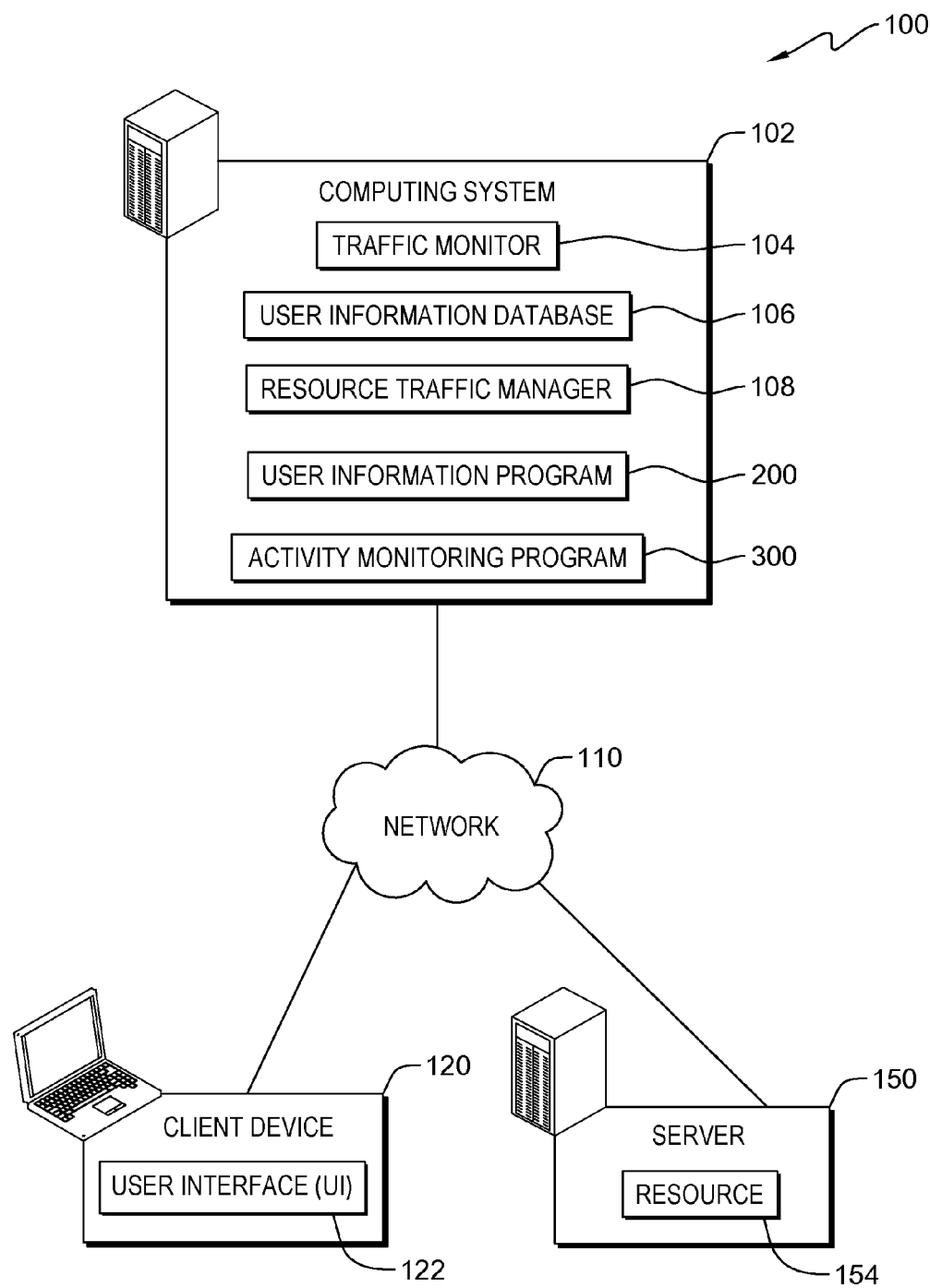
FIG. 1 illustrates a networked computing environment, in accordance with an embodiment of the present invention.

Embodiments of the present invention recognize that various technologies provide a user of a computing system a method to locate an item of interest (e.g., content, a digital resource), such as a search engine. However, search engines may not provide a notification to a user when there is an increase in activity associated with an item of interest. Other technologies provide notifications based on various criteria to a user of a computing device. A user can receive notifications that are personally set within a calendar program executing on a computing device. A user can receive a time-based notification associated with a "follow-up" alarm embedded within an e-mail. A user can receive notifications based on various subscribed services, such as a social media program, a web feed, a news channel, a syndicated broadcast, a newsletter, etc. However, some of these notifications are based on discussions and comments by various users and may not directly access the resource that is the basis of an increase of interest. In some instances, there can be an incentive for a business not providing a user a notification. For example, a business may benefit by assessing a late fee to a user if a user does not pay a bill by a due date.

Embodiments of the present invention recognize that notifications associated with increased activity for a digital resource, herein identified as a resource, are beneficial. In one example, notifications of increased activity may be associated with social pressure that induces users to respond in a timely manner and increase productivity. In another example, a notification of increased activity may indicate that various users are rushing to complete activities prior to system maintenance, where an advisement of the system maintenance has not yet been communicated to all the affected users. Another benefit associated with embodiments of the present invention is knowledge-sharing. In an example, identifying an increase in activity related to a new technology news article can communicate a notification to users that may not be familiar with the news outlet that is carrying the new technology news article.

Embodiments of the present invention identify increased activity associated with a digital resource and communicate a notification (e.g., a social enabled alert) that identifies the resource that is subject to the increased activity, such as accessing the resource, viewing the resource, downloading the resource, etc. Embodiments of the present invention may be included: within social media outlets, in browser technology, within a shared domain of an enterprise, etc. Embodiments of the present invention notify a user when an increase in activity associated with a resource, such as a uniform resource locator (URL), file, etc. exceeds a threshold value. Embodiments of the present invention may utilize: one or more predetermined threshold values and/or one or more dynamically determined threshold values, such as a threshold value based on a proportion of a population of users. Embodiments of the present invention may dictate a period of time during which a threshold value is exceeded, such as for a minimum of two hours. In addition, embodiments of the present invention utilize a profile for a user to determine a plurality of groups and/or individuals related to (e.g., with similar interest to) the user. For example, a user may be related to other groups/users by: a job role, a geographic location, demographics, a social media profile, registration with the same service, etc. Some embodiments of the present invention may utilize one or more elements of a profile of a user to determine one or more classifications for the user.

One embodiment of the present invention may utilize information input by a user to populate information (e.g., elements) of the profile of the user. Another embodiment of the present invention may utilize information associated with the user that is obtained from other sources to populate a profile for the user. Some embodiments of the present invention utilize information combined from the user and one or more other sources to populate the profile of the user. Various embodiments of the present invention enable a user to define multiple profiles. Further embodiments of the present invention dynamically modify the profile of a user based on various user actions, such as web browsing activity. In addition, some embodiments of the present invention enable a user to add, delete, and more modify elements of a profile.

Some embodiments of the present invention utilize a web browsing history of a user to determine one or more resources that may be of interest to a user. Other embodiments of the present invention utilize one or more profile elements, groups, and/or other users related to the user to determine one or more resources that may be of interest to the user. Embodiments of the present invention utilize analytics, semantics, cognitive, and/or inferential reasoning programs to determine groups and/or users that are related to the user. In addition, embodiments of the present invention utilize various network monitoring programs and/or services to determine which resources experience an increase in activity. Various embodiments of the present invention utilize anonymized data from a network monitoring program.

The present invention will now be described in detail with reference to the Figures. FIG. 1 is a functional block diagram illustrating networked computing environment 100 in an embodiment, in accordance with the present invention. In an embodiment, networked computing environment 100 includes: computing system 102, client device 120, and server 150, all interconnected over network 110. Many modifications to the depicted environment may be made by those skilled in the art without departing from the scope of the invention as recited by the claims.

Computing system 102, client device 120, and server 150 may be: laptop computers, tablet computers, netbook computers, personal computers (PC), desktop computers, personal digital assistants (PDA), smart phones, wearable devices (e.g., digital eyeglasses, smart glasses, smart watches, etc.), or any programmable computer systems known in the art. In certain embodiments, computing system 102, client device 120, and server 150 represent computer systems utilizing clustered computers and components (e.g., database server computers, application server computers, etc.) that act as a single pool of seamless resources when accessed through network 110, as is common in data centers and with cloud-computing applications. In general, computing system 102, client device 120, and server 150 are representative of any programmable electronic device or combination of programmable electronic devices capable of executing machine-readable program instructions and communicating with users of computing system 102, client device 120, and server 150, via network 110. Computing system 102, client device 120, and server 150 may include components, as depicted and described in further detail with respect to FIG. 4, in accordance with embodiments of the present invention.

Client device 120 may include user interface (UI) 122, and various programs and data (not shown). Examples of programs that client device 120 may include are: a web browser, an office productivity suite, one or more smart device applications (apps), an instant messaging (IM) app, etc. Examples of data that client device 120 may include, but are not limited to are: user preferences, a web browsing history, music files, video files, etc.

In one embodiment, UI 122 may be a graphical user interface (GUI) or a web user interface (WUI), and UI 122 can display text, documents, forms, web browser windows, user options, application interfaces, and instructions for operation, and include the information, such as graphic, text, and sound that a program presents to a user. In addition, UI 122 controls sequences/actions that the user employs to input and/or modify profile information, via user information program 200. In addition, UI 122 displays one or more notifications received from activity monitoring program 300. In some embodiments, a user of client device 120 can interact with UI 122 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) can generate UI 122 operating within the GUI environment of client device 120.

Computing system 102 includes: traffic monitor 104, user information database 106, resource traffic manager 108, user information program 200, and activity monitoring program 300. In an embodiment, computing system 102 may also include various programs and/or databases, such as but not limited to: a database management system; an e-mail program; analytics, semantics, cognitive, and/or inferential reasoning programs; server-side enterprise software, etc. (not shown). In some embodiments, computing system 102 accesses/subscribes to one or more computing programs and/or databases that are utilized by one or more embodiments of the present invention and/or client device 120, but the one or more computing programs and/or databases are not included on client device 120. For example, client device 120 may access analytic, semantic, cognitive, and/or inferential reasoning programs via network 110 to process (e.g., interpret) information input by a user and/or information associated with one or more elements of a user profile.

In one embodiment, computing system 102 communicates through network 110 to client device 120 and server 150. In another embodiment, computing system 102 communicates with one or more other computing systems and/or computing resources, such as a web server, e-mail server, a data aggregation service, etc. (not shown) via network 110. In various embodiments, computing system 102 monitors activity associated with users accessing one or more resources (e.g., resource 154) via network 110.

Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between computing system 102, client device 120, and server 150, in accordance with embodiments of the present invention. In various embodiments, network 110 operates locally via wired, wireless, or optical connections and can be any combination of connections and protocols (e.g., personal area network (PAN), near field communication (NFC), laser, infrared, ultrasonic, etc.).

Traffic monitor 104 is a program for monitoring network traffic and collecting and/or aggregating data associated with a plurality users and a plurality of resources (e.g., webpages, files, etc.) accessed by the plurality of users. Different instances of traffic monitor 104 may monitor: Internet traffic, intranet traffic, and/or internal (e.g., enterprise) network traffic. In an embodiment, traffic monitor 104 determines the identity of a user and one or more resources accessed by the user, such as webpages, files, information feeds, etc. In various embodiments, in instance of traffic monitor 104 may be associated with a social networking and/or social media service. In such an embodiment, traffic monitor 104 utilizes one more metrics associated with a central service (e.g., social media website) to identify a specific resource affected by increased activity as opposed to the trend/discussion of a plurality of users. For example, an instance of traffic monitor 104 may identify, via social media, a URL of the manufacturer of a "hot" new toy as opposed to tracking discussions related to the new toy. Alternatively, traffic monitor 104 may identify, via social media, a URL of a retailer that has a spike (e.g., an increase) in activity due to a special sale price for the new toy. Another metric that traffic monitor 104 may measure is the length of time that a user remains linked to a resource, such as watching a video or interacting with a program/app.

In some embodiments, traffic monitor 104 executes on another computer (not shown) and monitors network traffic related to other resources accessed via network 110. In these embodiments, traffic monitor 104 may be a subscribed service utilized by one or more programs executing on computing system 102. In other embodiments, information collected by traffic monitor 104 may be constrained based on whether some network communications are encrypted and whether traffic monitor 104 has access to decryption keys.

User information database 106 includes information related to profiles of a plurality of users that utilize embodiments of the present invention. In one embodiment, user information database 106 includes multiple profiles for a user, such as a work profile, a professional profile, and a personal profile. In various embodiments, user information database 106 interfaces with a data collection program, such as user information program 200 that utilizes UI 122 to obtain information from a user that populates one or more fields (e.g., elements) of a profile of a user. In some scenarios, user information database 106 includes profile information (e.g., profile elements) that is input by a user, via UI 122 to one or more fields of a form, such as a text box. In other scenarios, user information database 106 includes profile information that is selected by a user in response to UI 122 displaying one or more predefined fields. In one example, UI 122 may display selections for one or more profile elements that include predefined information for selection via: radio buttons, list boxes, date pickers, dropdown menus, combo boxes, etc. In another example, user information database 106 includes one or more profile elements that a user uses to define a threshold value (e.g., a predetermined threshold) for one or more resources. In various scenarios, user information database 106 may include one or more profile elements that are free-form information fields within UI 122. In an example, free-form information fields are subsequently semantically parsed and analyzed for relevant information that is associated with one or more profile fields within user information database 106.

In another embodiment, user information database 106 includes dictated fields (e.g., profile elements) within a profile that a user inputs data. If sufficient dictated fields do not include data, user information database 106 may indicate the profile of the user is incomplete (e.g., not active). An incomplete profile of a user may preclude identifying a resource of interest to the user. In a further embodiment, user information database 106 includes one or more profile elements that includes data obtained from one or more other sources, such as a data aggregation service or information on client device 120 (e.g., a browsing history of a user).

Resource traffic manager 108 is a program and/or a suite of functions that analyzes network traffic data to identify one or more trends and in particular, increases in activity associated with a resource. Resource traffic manager 108 obtains activity and/or network traffic information from one or more instances of traffic monitor 104. In various embodiments, resource traffic manager 108 interfaces with activity monitoring program 300, such as receiving one or more queries from activity monitoring program 300 and communicating one or more results. In some scenarios, resource traffic manager 108 actively responds to a query initiated by activity monitoring program 300. In other scenarios, resource traffic manager 108 queues up one or more queries submitted by activity monitoring program 300. Resource traffic manager 108 delays a response to activity monitoring program 300 until one or more conditions are met, such as activity related to a resource exceeds threshold value included in a query.

In some embodiments, resource traffic manager 108 utilizes one or more statistical analysis methods to determine when a value for an activity associated with a resource is greater than a threshold value. In one example, resource traffic manager 108 identifies an increase in activity for a resource that is accessed (e.g., viewed, downloaded, etc.) at a rate 1.5 standard deviations above the average value of access rate (e.g., hits/day, downloads/hour, etc.). In another example, resource traffic manager 108 identifies an increase in activity for a resource that is based on a moving average calculation. In some scenarios, resource traffic manager 108 utilizes a threshold value associated with a resource that is dictated by a user. In other scenarios, resource traffic manager 108 utilizes a threshold value associated with a resource that is dictated by another entity, such as computing system 102, an owner of resource, and/or a computing system (e.g., server 150) hosting a resource (e.g., resource 154). In a further scenario, resource traffic manager 108 utilizes machine learning based on historical user responses to notifications and dynamically determines a threshold value associated with a resource, such that the threshold value is optimized to minimize a rejection rate of a notification. For example, resource traffic manager 108 identifies a frequency of notification that increase the probability that a notification is ignored by a user, such as rejecting a notification as SPAM.

In other embodiments, resource traffic manager 108 utilizes another mathematical technique, such as a derivative function to determine a rate of change (e.g., acceleration, rate of increase) of activity associated with a resource that is accessed. In further embodiments, resource traffic manager 108 utilizes a combination of analytical methods to identify an increase in activity associated with a resource. In an example, resource traffic manager 108 utilizes one or more filters to exclude traffic associated with automatic programs (e.g., advertising redirects from another webpage) and/or servers while analyzing activity associated with a resource. In another example, resource traffic manager 108 may communicate with server 150 to determine whether the increased traffic associated with resource 154 is user traffic or is associated with a denial-of-service attack.

User information program 200 is a program that obtains information associated with a user to generate one or more profiles for the user. User information program 200 develops a profile for a user that includes a plurality of elements (e.g., fields). Some elements of a profile can be a category or subcategory of information, such as demographic data, likes, preferences, etc. Other elements of a profile can include responses (e.g., comments in natural language) to questions for example. In an embodiment, user information program 200 obtains for one or more profile elements based on data input by a user via UI 122. In one example, user information program 200 is an app that generates UI 122 as a self-contained interface. In another example, user information program 200 displays UI 122 as multiple webpages that are presented to a user via a web browser. In some embodiments, user information program 200 obtains additional information associated with a user from one or more external sources utilized a user, such as social media/networking service, special interest (e.g., photos, recipes, videos, etc.) website, a blog site, etc. In other embodiments, user information program 200 obtains additional information associated with a user from: data aggregation services, marketing companies, public records and/or databases (e.g., newspaper articles), etc.

In an embodiment, user information program 200 analyzes elements of a profile of a user to determine one or more classifications for the user. In another embodiment, user information program 200 determines a method for communicating a notification to a user based on: one or more user preferences, client device 120 and/or a communication program executing on client device 120, a location of the user (e.g., active user profile), etc. In a further embodiment, user information program 200 may enable a user to access and/or modify one or more elements of a profile of the user. In various embodiments, user information program 200 dynamically updates one or more elements of a profile of a user based on activity of the user within network 110, such as determining another group and/or interest associated with the user based on websites visited by the user.

Activity monitoring program 300 is a program that determines an increase in activity corresponding to a resource of interest to a user and communicates a notification related to the resource of interest to the user. In one embodiment, activity monitoring program 300 utilizes one or more profiles of a user to identify one or more resources of interest to the user. Based on the analysis of activity related to a plurality of resources, such as network traffic and accessing and/or downloading of a resource, activity monitoring program 300 identifies a level of activity or increase in activity related to the resource that exceeds a threshold value. In various embodiments, activity monitoring program 300 constrains an identification of increased activity associated with a resource to one or more groups of users that respectively includes user profile elements and/or classifications related to the user. In response to determining that a resource of interest to a user experiences a level of activity or an increase in activity related to the resource that exceeds a threshold value, activity monitoring program 300 communicates a notification to the user. Activity monitoring program 300 may utilize one or more methods of communication known in the art to communicate a notification to a user, such as an e-mail, a text message, a pop-up notification, a web dashboard, etc.

Server 150 includes resource 154. Examples of resource 154 include, but are not limited to: URLs, video files, music files, forms, and enterprise information. In some embodiments, server 150 includes additional resources, such as webpages, programs, and databases (not shown). In one embodiment, server 150 grants a user of client device 120 direct access to resource 154 via network 110. In another embodiment, server 150 dictates that a user of client device 120 authenticate (e.g., initiates a login protocol) to access resource 154.

Figure 2:
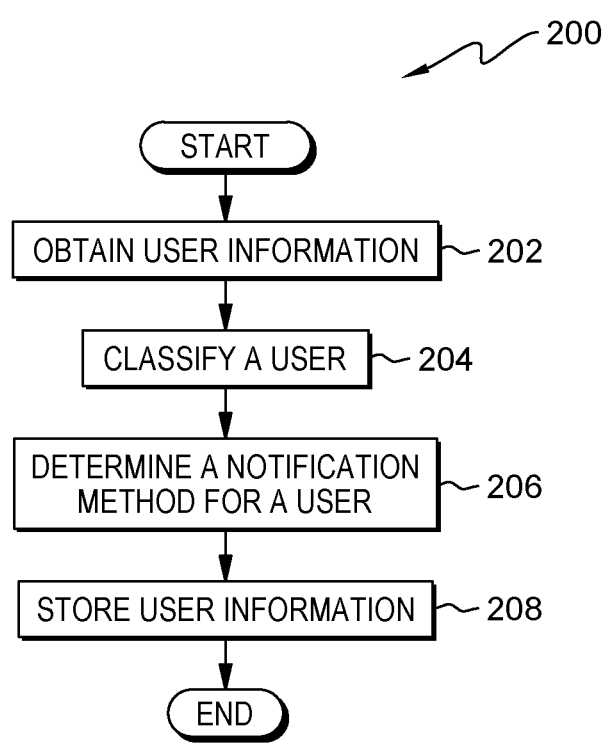
FIG. 2 depicts a flowchart of the operational steps of an user information program, in accordance with an embodiment of the present invention.

FIG. 2 is a flowchart depicting operational steps for user information program 200, a program that analyzes information provided by a user and/or obtained from other sources to generate one or more user profiles, in accordance with embodiments of the present invention. In some embodiments, user information program 200 may update a profile of a user based on manual user input. In other embodiments, user information program 200 dynamically modifies a profile of a user based on the actions of the user within networked computing environment 100.

In step 202, user information program 200 obtains user information. In some embodiments, user information program 200 utilizes user information, without modification, to populate one or more elements of one or more profiles of a user. In other embodiments, user information program 200 may utilize analytics, semantics, cognitive, and/or inferential reasoning programs to interpret the user information such that a broader term/description is input to one or more elements of a profile of a user. In an example, user information program 200 may obtain the terms: Sphinx, Burmese, Munchkin in an input field associated with pets. Therefore, user information program 200 may generalize a profile element of a user for pet preferences to "cats," and user information program 200 may include the three input terms (e.g., elements) in a subcategory of "breeds." In an alternative embodiment, user information program 200 may include user information input via: a free-form text field, and radio-buttons and/or check-box information selection.

In one embodiment, user information program 200 obtains user information from a user via UI 122. In an example, user information program 200 is associated with a notification subscription service (e.g., not shown). User information program 200 activates a WUI (e.g., an instance of UI 122) that display one or more pages and a plurality of input fields for the user to input information. In an embodiment, user information program 200 permits one or more blank input fields. In various embodiments, user information program 200 provides an option for a user to retrieve and/or browse a profile of the user; and add, modify, and/or delete one or more elements of the profile of the user.

In further embodiment (in step 202), user information program 200 includes information associated with a user that is obtained from one or more other sources. In one scenario, user information program 200 obtains user information from a source that a user may control the access to the information source. In one example, user information program 200 may obtain information associated with a user from client device 120, such as a web browsing history, cookies stored by a web browser, etc. and include at least a portion (e.g., summary, top 10 sites, etc.) of the information within one or more elements of the profile of the user. In another example, user information program 200 may obtain user information from a source accesses via network 110, such as a social media website. In another scenario, user information program 200 obtains information associated with a user from a source that aggregates and/or sells information for a plurality of user, such as a census bureau, a media polling group, a direct marketing organization, etc. In various scenarios, user information program 200 may dynamically include information from another source that is associated with one or more elements of a profile of a user to the profile of a user. In some instances, user information program 200 may notify a user to accept, modify, and/or delete dynamically included information.

In step 204, user information program 200 classifies a user. In some embodiments, user information program 200 analyzes a profile of a user and creates one or more indexes, links, records, etc. that are associated with one or more elements of the profile of the user. The one or more indexes, links, records, etc., identify an element (e.g., trait, preference, etc.) that is similar to an element of one or more profiles corresponding to one or more other users stored in user information database 106. In an example, user information program 200 identifies a table within user information database 106 that is designated for sports and, based on one or more elements of a profile of a user, which sports(s) the user expresses an interest and which team(s) of a sport. User information program 200 associates the user with one or more other users based on information related to sports and sports teams.

In other embodiments, user information program 200 utilizes analytical and/or probabilistic techniques to classify a user and determine associations with one or more users of profiles stored in user information database 106. User information program 200 may utilize techniques such as, but not limited to, multivariate analysis, a decision tree, a naïve Bayes classifier, etc. In one example, user information program 200 identifies that a profile element of a user indicates a preference for rock climbing. In one instance, based on websites browsed by a user and other profile elements, user information program 200 may classify (e.g., associate, group) the user with other users that engage in outdoor activities, such as backpacking. In another instance, based on newsfeeds that a user receives and other profile elements, user information program 200 may classify (e.g., associate, group) the user with other users that engage in advocacy for a cause.

In a further embodiment, user information program 200 reviews the modifications that a user makes to one or more profile elements and/or response to notifications and utilizes machine learning to improve the accuracies of associations (e.g., to add, modify, delete, etc.) of the user to other users. In an alternative embodiment, user information program 200 may classify a user as a member of a group such that subsequent analyses performed by one or more programs responds to the group as a single user. In an example, user information program 200 identifies ten or more profile elements common to a group of users and user information program 200 classifies the group of used as "economic journalists" with respect to subsequently identifying a resource of interest to "economic journalists" that experiences activity above a threshold value for the group.

In step 206, user information program 200 determines a notification method for a user. In one embodiment, user information program 200 determines that one or more elements of a profile of a user identifies a method associated with the transmission (i.e., communication) of a notification to the user. For example, user information program 200 may determine that a user indicates that text messaging to a smartphone is the primary preference of the user for the transmission of a notification. In another embodiment, user information program 200 determines that a notification method is dictated by the role (e.g., job, status) and/or location of a user. For example, user information program 200 may determine that a user indicates that job based notifications are communicated via an internal e-mail address in response to determining that the user is at work.

In some embodiments, user information program 200 determines that a user selects a real-time notification scheme. In one example, user information program 200 identifies from a profile of a user that instances of client device 120 are polled to determine which instance of client device 120 is active and communicates a notification to the user via the active instance of client device 120. In another example, user information program 200 identifies from a profile of a user to delay communicating a notification to a user until the user is determine to be on-line, thereby presenting the notification closer to the beginning of a last-in first-out list, such as an e-mail queue.

In some embodiments, user information program 200 may determine that a user indicates a hierarchy of methods that are utilized to communicate a notification to a user. For example, user information program 200 determines that, if a user if off-line and cannot receive an e-mail notification, then user information program 200 determines a text message is the alternative communication method. In a further embodiment, user information program 200 determines that a user indicates that a retransmission of a notification may occur in response to resource traffic manager 108 not detecting the access of the resource associated notification by the user.

In step 208, user information program 200 stores user information. In one embodiment, user information program 200 stores user information within user information database 106 as user profiles. In some embodiments, user information program 200 stores one or more user profiles on client device 120 and user information program 200 store the one or more determined classification, associations, and/or grouping derived from a profile of the user within user information database 106. In other embodiments, user information program 200 stores one or more user profiles and the one or more determined classification, associations, and/or grouping derived from a profile of the user within user information database 106.

Figure 3:
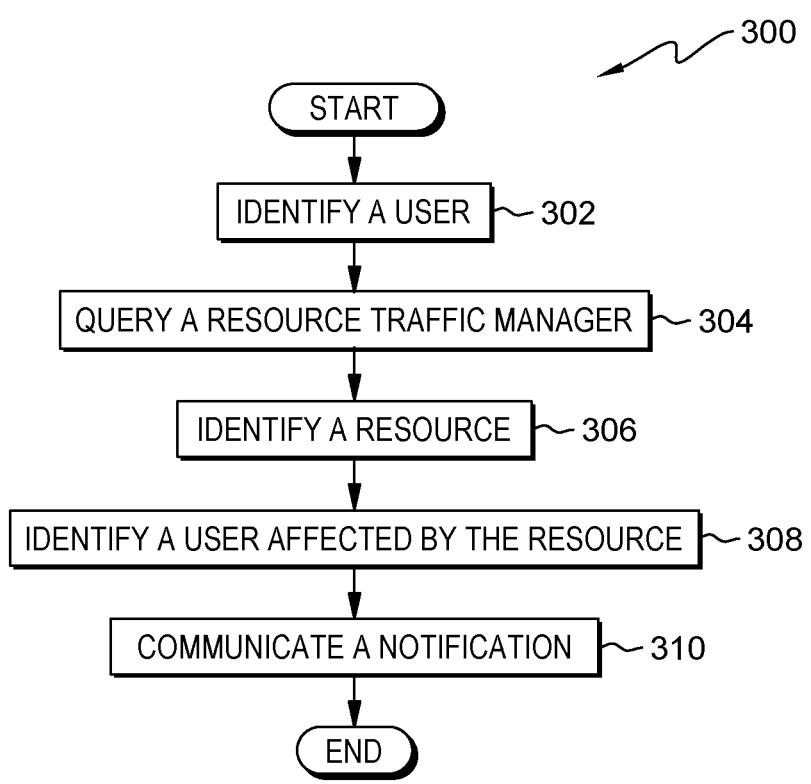
FIG. 3 depicts a flowchart of the operational steps of an activity monitoring program, in accordance with an embodiment of the present invention.

FIG. 3 is a flowchart depicting operational steps for activity monitoring program 300, a program for determining an increase in activity corresponding to a resource of interest to a user and communicating a notification related to the resource to the user, in accordance with embodiments of the present invention. In an embodiment, activity monitoring program 300 identifies a resource of interest to a user based on one or more profiles associated with the user.

In step 302, activity monitoring program 300 identifies a user. In one embodiment, activity monitoring program 300 identifies a user to determine which profile of the user (e.g., stored within user information database 106) to utilize. In one example, activity monitoring program 300 identifies that a user accesses an enterprise network and utilizes the "work" profile for a user. In another example, activity monitoring program 300 determines that a user is at home and utilizes a "personal" profile. In another embodiment, activity monitoring program 300 utilizes one or more profiles associated with a user without determining whether the user is active, such as utilizing client device 120. In an alternative embodiment, activity monitoring program 300 may identify a group as a user. In an example, activity monitoring program 300 determines that within an enterprise that each department is identified (e.g., classified) as a user with profile elements related to the mission/operation of the department as opposed to individual profiles/user of the department.

In various embodiments, activity monitoring program 300 identifies additional information related to a user, such as but not limited to, a location of the user, an itinerary of the user, a calendar of the user, a status associated with the user (e.g., client device 120 is active, the user is logged on to an account, etc.). In one example, activity monitoring program 300 polls client device 120 to determine a current physical and temporal location (e.g., a where and a when) for a user. In one example, activity monitoring program 300 accesses a calendar of a user (e.g., on client device 120, on a computing device accessible via network 110) to determine a future physical and temporal location of the user.

In step 304, activity monitoring program 300 queries a resource traffic manager. In one embodiment, activity monitoring program 300 queries resource traffic manager 108 to determine whether resource traffic manager 108 identifies one or more resources that are experiencing activity that exceeds a threshold value. In one scenario, activity monitoring program 300 includes a threshold value included in a profile of a user within a query communicated to resource traffic manager 108. In another scenario, activity monitoring program 300 includes a system defined threshold value within a query to resource traffic manager 108.

In some embodiments, activity monitoring program 300 includes one or more additional criteria to determine whether a threshold value is exceeded, such as time and/or that an increase in activity related to a resource is constrained to a group of users associated with an identified user. In one scenario, activity monitoring program 300 dictates an interval of time during which the activity associated with a resource exceeds a threshold value, to trigger a determination, such as more than 500 hits within a 10-minute interval of time. In another scenario, activity monitoring program 300 dictates an aggregated access time associated with a resource to trigger a determination. In an example, activity monitoring program 300 determines an increase in interest for a resource, such as a video, based on the aggregated time that a group of users associated with an identified user views the resource as opposed to the number of user that link to the resource, such as 1000 hours of access within a day. In this example, activity monitoring program 300 may discount activity associated with a resource that attracts users, but the resource does not maintain the interest of some users and that some users disengage (e.g., leave) the resource within a short time.

In various embodiment, activity monitoring program 300 communicates one or more queries to resource traffic manager 108 that resource traffic manager 108 adds to a queue until one or more conditions that activity monitoring program 300 includes (e.g., dictates) in the query occur.

In an alternative embodiment, activity monitoring program 300 may query resource traffic manager 108 and/or traffic monitor 104 to determine whether a user accessed a resource that was associated with a notification that was previously communicated to the user. In an example, if activity monitoring program 300 determines that a user did not access a resource associate with a previous notification, then activity monitoring program 300 may review a profile of the user to identify an alternative method for communicating a notification.

In step 306, activity monitoring program 300 identifies a resource. In one embodiment, in response to a query, activity monitoring program 300 receives an indication from resource traffic manager 108 that identifies a resource. Examples of the indication received by activity monitoring program 300 include, but are not limited to, a URL, a file name, a hyperlink to the resource, and a file transfer protocol (ftp) address. In one scenario, activity monitoring program 300 receives indications corresponding to one or more resources that experience activity that exceeds the threshold value of the profile of the user. In another scenario, activity monitoring program 300 receives indications corresponding to one or more resources that experience activity that exceeds the system defined threshold value. In an example, activity monitoring program 300 receives indications corresponding to one or more resources that exceed a threshold value determined for a group of users.

In some embodiments, activity monitoring program 300 identifies the resource that corresponds to each indication. In an example, activity monitoring program 300 analyzes metadata associated with a resource (e.g., as https:/webpage-.com/videos/7a7zg923045t15/) to identify the resource for a user. In this example, metadata may include: a title of the video, the author of the video, a timestamp for the video, etc. Examples of other information that activity monitoring program 300 may identify within the metadata associated with the resource may include: a geographic (i.e., physical) location, an calendar entry (i.e., a temporal occurrence), a registration deadline, etc. In other embodiments, activity monitoring program 300 analyzes the source (e.g., website) that includes the resource to identify the resource to a user. In various embodiments, activity monitoring program 300 combines information analyzed and/or obtained from multiple sources to identify the resource to a user. For example, activity monitoring program 300 may use contextual analysis of the resource www.company.com/cyberreadiness to determine that the URL is associated with yearly on-line training that each employee reviews and certifies to indicate the completion of the training.

In step 308, activity monitoring program 300 identifies a user affected by the resource. In one embodiment, activity monitoring program 300 identifies a user affected by (e.g., interested in) the identified resource based on profile information associated with a user stored in user information database 106. In another embodiment, activity monitoring program 300 identifies a user affected by the identified resource based on one or more elements of a profile of the user used to generate a query (step 304). In some embodiments, activity monitoring program 300 identifies a user affected by (e.g., interested in) the identified resource based on the profile that is active for the user, such as a work profile. In various embodiments, activity monitoring program 300 identifies a group of users affected by the identified resource.

In a further embodiment, activity monitoring program 300 may utilize a location (e.g., physical and/or temporal) of the user (step 302) to determine whether a user is affected by the identified resource. For example, if activity monitoring program 300 determines that a user is within a tolerance (e.g., proximity) of an identified resource, based on analysis of metadata associated with the identified resource (step 306), then activity monitoring program 300 determines that the user if affected by the identified resource.

In step 310, activity monitoring program 300 communicates a notification. Activity monitoring program 300 communicates a notification to one or more users. In one embodiment, activity monitoring program 300 generates a notification and communicates the generated notification to a user affected by the identified resource. In another embodiment, activity monitoring program 300 generates a notification and communicates the generated notification to a group of users affected by the identified resource. Activity monitoring program 300 includes at least an indication (e.g., link, a file name, etc.) corresponding to a resource in a notification. In various embodiments, activity monitoring program 300 includes additional information associated with and/or analyzed for a resource (step 306) to provide a user context for the identified resource. In one example, activity monitoring program 300 may include text, such as "Possible bio-active compound identified in Polybia Paulista. Refer to https://webpage.com/videos/7a7zq923045t15/." In another example, activity monitoring program 300 may communicate a notification for an identified resource to a group of users, such as "An increased number of employees are accessing www.company.com/cyberreadiness, there may be required actions pending."

In some embodiments, activity monitoring program 300 notifies a user based on a profile for a user and/or the profile associated with an identified resource. In an example, activity monitoring program 300 utilizes an intranet e-mail address for a user, based on the work profile for the user for an identified work-related resource. In other embodiments, activity monitoring program 300 notifies a user based on a hierarchy of notification methods defined within the profile of the user. In an example, activity monitoring program 300 may utilize IM or a smartphone app to communicate a notification to a user in response to determining that the user is not logged into a work PC. In a further embodiment, if activity monitoring program 300 determines that a user is within a physical and temporal proximity of an identified resource, based on analysis of metadata associated with the identified resource, then activity monitoring program 300 communicates a notification to the user. In an example, activity monitoring program 300 determines that a resource (e.g., a website) includes a calendar of seminars that lists a location and time for each session of the seminars. Activity monitoring program 300 can determine, based on a current and/or identified future (e.g., based on a calendar of the user), physical and temporal location whether the user is or will be in proximity to one or more seminar sessions.

In a further embodiment, activity monitoring program 300 determines whether to communicate a notification to a user. In one scenario, if activity monitoring program 300 determines that a user did not access an identified resource associated with a previous notification (step 304), then activity monitoring program 300 communicates a notification to the user. Alternatively, if activity monitoring program 300 determines that a user accessed an identified resource associated with a previous notification (step 304), then activity monitoring program 300 does not communicate a notification to the user.

Figure 4:
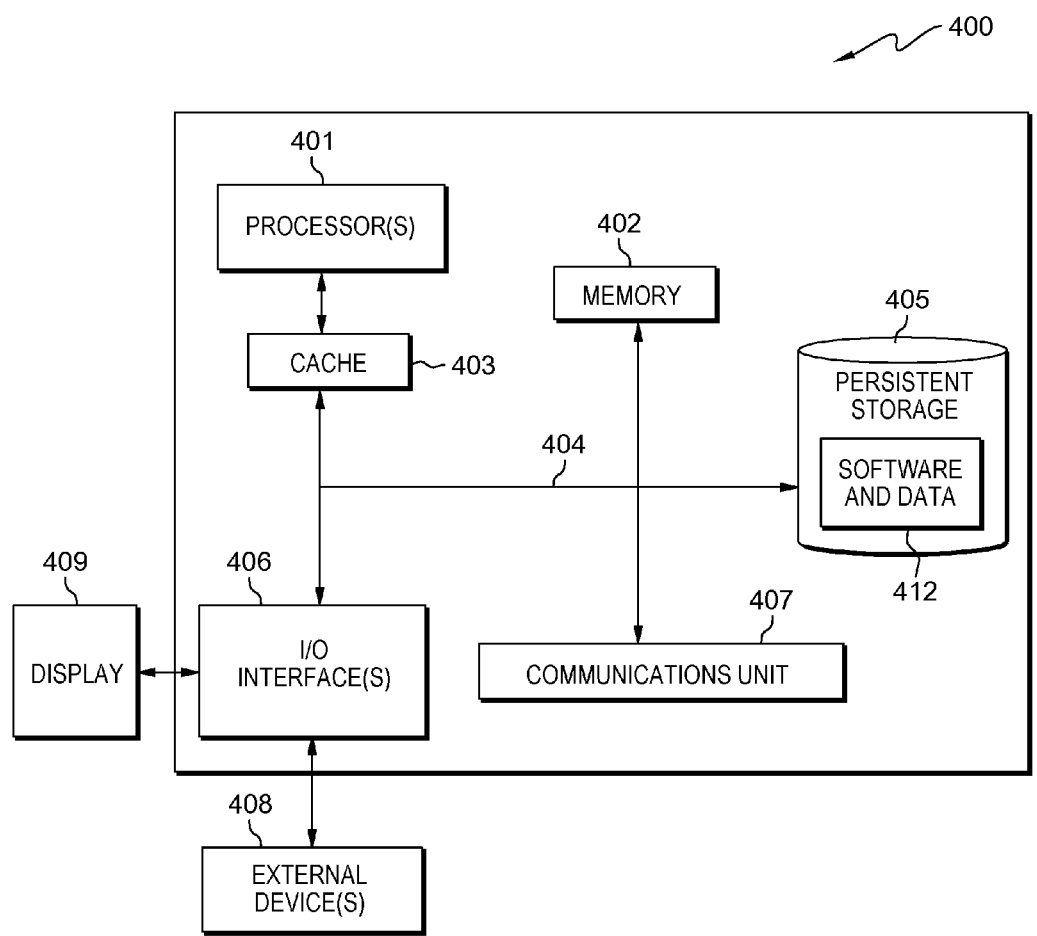
FIG. 4 is a block diagram of components of a computer, in accordance with an embodiment of the present invention.

FIG. 4 depicts a block diagram of computer system 400, which is representative of computing system 102, client device 120, and server 150. Computer system 400 is an example of a system that includes software and data 412. Computer system 400 includes processor(s) 401, memory 402, cache 403, persistent storage 405, communications unit 407, input/output (I/O) interface(s) 406, and communications fabric 404. Communications fabric 404 provides communications between memory 402, cache 403, persistent storage 405, communications unit 407, and I/O interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to computing system 102, software and data 412 includes: traffic monitor 104, user information database 106, resource traffic manager 108, user information program 200, activity monitoring program 300, and various programs (not shown). With respect to client device 120, software and data 412 includes UI 122. With respect to server 150, software and data 412 includes: resource 154, and various programs and data (not shown).

Communications unit 407, in these examples, provides for communications with other data processing systems or devices, including resources of computing system 102, client device 120, and server 150. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives, such as "at least one of A, B, and C" should be interpreted to mean "at least one A, at least one B, at least one C, or any combination of A, B, and C."

Additionally, the phrase "based on" should be interpreted to mean "based, at least in part, on."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for event notification, the method comprising:
    identifying, by one or more processors, a profile of a first user, wherein the profile of the first user includes one or more profile elements;
    identifying, by one or more processors, a plurality of users having a corresponding profile that includes at least one profile element in common with the identified profile of the first user;
    identifying, by one or more processors, a computer network accessible resource;
    determining, by one or more processors, an increase in activity of the identified computer network accessible resource by the identified plurality of users;
    identifying, by one or more processors, that the user profile of the first user includes another profile element, wherein the other profile element is associated with a location of the first user during a first period of time;
    determining, by one or more processors, based on polling one or more devices of the first user via a network, a current physical location of the first user;
    identifying, by one or more processors, a second period of time and a physical location related to a temporal occurrence of an event associated with the identified computer network accessible resource;
    determining, by one or more processors, based on the other element of the profile of the first user and the determined current physical location of the first user, that the first user is within a physical and a temporal proximity of the temporal occurrence of the event associated with the identified computer network accessible resource; and
    responsive to determining that the first user is within the physical and the temporal proximity of the event associated with the identified computer network accessible resource, communicating, by one or more processors, via the network, a notification to the first user utilizing a device of the first user that is active, wherein the communicated notification provides an indication of the determined increase in activity of the identified computer network accessible resource by the identified plurality of users.

2. The method of claim 1, wherein the identified computer network accessible resource is a website, and wherein the website is associated with a profile element of the profile of the first user.

3. The method of claim 1, wherein determining an increase of activity of the identified computer network accessible resource by the identified plurality of users further comprises:
    analyzing, by one or more processors, network traffic data between the identified computer network accessible resource and the identified plurality of users; and
    determining, by one or more processors, that the analyzed network traffic data exceeds a threshold value within a dictated period of time.

4. The method of claim 1, wherein the communicated notification further includes a link to access the identified computer network accessible resource and information that provides context for the identified computer network accessible resource.

5. The method of claim 3, further comprising:
    determining, by one or more processors, based on the analysis of the network traffic data corresponding the identified computer network accessible resource that the first user has not accessed the identified resource; and
    responsive to identifying that the first user has not accessed the identified computer network accessible resource, communicating, by one or more processors, the notification to the first user.

6. The method of claim 1, wherein a profile of a user includes a plurality of profile elements, and wherein one or more profile elements are utilized to determine at least one classification for the user.

7. The method of claim 1, wherein identifying a computer network accessible resource further includes identifying metadata associated with a computer network accessible resource that includes information related to the event associated with the computer network accessible resource, wherein the information is selected from a group consisting of: a geographic location, an calendar entry, and a registration deadline.

8. The method of claim 1, wherein polling the one or more devices of the first user further determines the device of the first user that is active.

9. A computer program product for event notification, the computer program product comprising:
    one or more computer readable storage media and program instructions stored on the one or more computer readable storage media, the program instructions readable/executable by one or more computer processors:
        program instructions to identify a profile of a first user, wherein the profile of the first user includes one or more profile elements;
        program instructions to identify a plurality of users having a corresponding profile that includes at least one profile element in common with the identified profile of the first user;
        program instructions to identify a computer network accessible resource;
        program instructions to determine an increase in activity of the identified computer network accessible resource by the identified plurality of users;
        program instructions to identify that the user profile of the first user includes another profile element, wherein the other profile element is associated with a location of the first user during a first period of time;
        program instructions to determine, based on polling one or more devices of the first user via a network, a current physical location of the first user;

program instruction to identify a second period of time and a physical location related to a temporal occurrence of an event associated with the identified computer network accessible resource;

program instructions to determine, based on the other element of the profile of the first user and the determined current physical location of the first user, that the first user is within a physical and a temporal proximity of the temporal occurrence of the event associated with the identified computer network accessible resource; and program instruction to respond to determining that the first user is within the physical and the temporal proximity of the event associated with the identified computer network accessible resource by communicating, via the network, a notification to the first user utilizing a device of the first user that is active, wherein the communicated notification provides an indication of the determined increase in activity of the identified computer network accessible resource by the identified plurality of users.

10. The computer program product of claim 9, wherein the identified computer network accessible resource is a website, and wherein the website is associated with a profile element of the profile of the first user.

11. The computer program product of claim 9, wherein determining an increase of activity of the identified computer network accessible resource by the identified plurality of users further comprises:

program instructions to analyze network traffic data between the identified computer network accessible resource and the identified plurality of users; and program instructions to determine that the analyzed network traffic data exceeds a threshold value within a dictated period of time.

12. The computer program product of claim 9, wherein the communicated notification further includes a link to access the identified computer network accessible resource and information that provides context for the identified computer network accessible resource.

13. The computer program product of claim 11, further comprising:

program instructions to determine, based on the analysis of the network traffic data corresponding the identified computer network accessible resource that the first user has not accessed the identified resource; and program instructions to respond to identifying that the first user has not accessed the identified computer network accessible resource by communicating the notification to the first user.

14. The computer program product of claim 9, wherein a profile of a user includes a plurality of profile elements, and wherein one or more profile elements are utilized to determine at least one classification for the user.

15. A computer system for event notification, the computer system comprising:

one or more computer processors;
one or more computer readable storage media;
program instructions stored on the computer readable storage media for reading/execution by at least one of the one or more computer processors, the program instructions further comprising:

program instructions to identify a profile of a first user, wherein the profile of the first user includes one or more profile elements;

program instructions to identify a plurality of users having a corresponding profile that includes at least one profile element in common with the identified profile of the first user;

program instructions to identify a computer network accessible resource;

program instructions to determine an increase in activity of the identified computer network accessible resource by the identified plurality of users;

program instructions to identify that the user profile of the first user includes another profile element, wherein the other profile element is associated with a location of the first user during a first period of time;

program instructions to determine, based on polling one or more devices of the first user via a network, a current physical location of the first user;

program instruction to identify a second period of time and a physical location related to a temporal occurrence of an event associated with the identified computer network accessible resource;

program instructions to determine, based on the other element of the profile of the first user and the determined current physical location of the first user, that the first user is within a physical and a temporal proximity of the temporal occurrence of the event associated with the identified computer network accessible resource; and program instruction to respond to determining that the first user is within the physical and the temporal proximity of the event associated with the identified computer network accessible resource by communicating, via the network, a notification to the first user utilizing a device of the first user that is active, wherein the communicated notification provides an indication of the determined increase in activity of the identified computer network accessible resource by the identified plurality of users.

16. The computer system of claim 15, wherein the identified computer network accessible resource is a website, and wherein the website is associated with a profile element of the profile of the first user.

17. The computer system of claim 15, wherein determining an increase of activity of the identified computer network accessible resource by the identified plurality of users further comprises:

program instructions to analyze network traffic data between the identified computer network accessible resource and the identified plurality of users; and program instructions to determine that the analyzed network traffic data exceeds a threshold value within a dictated period of time.

18. The computer system of claim 15, wherein the communicated notification further includes a link to access the identified computer network accessible resource and information that provides context for the identified computer network accessible resource.

19. The computer system of claim 17, further comprising:

program instructions to determine, based on the analysis of the network traffic data corresponding the identified computer network accessible resource that the first user has not accessed the identified resource; and program instructions to respond to identifying that the first user has not accessed the identified computer network accessible resource by communicating the notification to the first user.

* * * * *